US012657018B2

(12) United States Patent     (10) Patent No.:   US 12,657,018 B2

Voet et al.     (45) Date of Patent:    Jun. 16, 2026

(54) METHOD, SYSTEM, COMPUTER PROGRAM AND STORAGE MEDIUM FOR DOCUMENTING AN UPDATE OF SOFTWARE OF A COMPONENT OF A VEHICLE

(71) Applicant: Bayerische Motoren Werke Aktiengesellschaft, Munich (DE)

(72) Inventors: Hanno Voet, Munich (DE); Gunther Buecherl, Olching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 379 days.

(21) Appl. No.: 17/922,955

(22) PCT Filed: Mar. 4, 2021

(86) PCT No.: PCT/EP2021/055411

§ 371 (c)(1),
(2) Date: Nov. 2, 2022

(87) PCT Pub. No.: WO2021/239281

PCT Pub. Date: Dec. 2, 2021

(65) Prior Publication Data

US 2023/0168881 A1     Jun. 1, 2023

(30) Foreign Application Priority Data

May 26, 2020    (DE) ..................... 10 2020 114 098.3

(51) Int. Cl.
   *G06F 9/445*      (2018.01)
   *G06F 8/65*      (2018.01)
             (Continued)

(52) U.S. Cl.
   CPC ................. *G06F 8/65* (2013.01); *G07C 5/08* (2013.01)

(58) Field of Classification Search
   CPC .......... G06F 8/65; G07C 5/08; B60R 16/0231
   See application file for complete search history.

(56) References Cited

U.S. PATENT DOCUMENTS

| | | | | |
|---|---|---|---|---|
| 6,654,950 B1* | 11/2003 | Barnishan | ................. | G06F 8/76 |
| | | | | 717/136 |
| 6,816,971 B2* | 11/2004 | Schmidt | ............. | G05B 19/0426 |
| | | | | 713/193 |

(Continued)

FOREIGN PATENT DOCUMENTS

| | | |
|---|---|---|
| DE | 102016115545 A1 | 3/2017 |
| DE | 102018220976 A1 | 6/2019 |
| EP | 3543844 B1 | 4/2020 |

OTHER PUBLICATIONS

International Search Report corresponding to International Patent Application No. PCT/EP2021/055411, dated May 21, 2021 (4 pages).

(Continued)

*Primary Examiner* — S. Sough
*Assistant Examiner* — Mohammad H Kabir
(74) *Attorney, Agent, or Firm* — Maginot, Moore & Beck LLP

(57) ABSTRACT

A method for documenting an update of software of a component of a vehicle includes receiving in a backend a request message transmitted by the vehicle, the request message comprising system parameters of the vehicle. In response to the request message, a check is carried out at the backend using the system parameters in order to determine whether an update of the software of the component is required and, if so, transmitting an update message by the backend to the vehicle. The update message includes at least one text module which in each case describes a change relating to existing software of the component. A respective text module is assigned in each case to a component. In (Continued)

response to the update message, the at least one text module is provided on an output unit assigned to the vehicle.

18 Claims, 2 Drawing Sheets

(51) Int. Cl.
*H04L 29/08* (2006.01)
*G07C 5/08* (2006.01)

(56) References Cited

U.S. PATENT DOCUMENTS

| | | | | |
|---|---|---|---|---|
| 8,799,408 B2 | 8/2014 | Thiyagarajan et al. | | |
| 2007/0208669 A1* | 9/2007 | Rivette | ................ | G06Q 50/184 |
| | | | | 705/310 |
| 2011/0237186 A1* | 9/2011 | Preissinger | ........... | B60R 16/037 |
| | | | | 455/41.1 |
| 2014/0107924 A1* | 4/2014 | Tava | .................. | G01C 21/3407 |
| | | | | 701/533 |
| 2015/0339114 A1 | 11/2015 | Rockwell et al. | | |
| 2016/0196131 A1* | 7/2016 | Searle | ..................... | H04L 65/40 |
| | | | | 717/173 |
| 2017/0322791 A1* | 11/2017 | Tiles | ......................... | G06F 8/65 |
| 2018/0098227 A1* | 4/2018 | Carnelli | ............... | H04W 4/029 |
| 2020/0057630 A1 | 2/2020 | Cho et al. | | |

OTHER PUBLICATIONS

German Search Report corresponding to German Patent Application No. 10 2020 114 098.3, dated May 6, 2021 (6 pages).

\* cited by examiner

METHOD, SYSTEM, COMPUTER PROGRAM AND STORAGE MEDIUM FOR DOCUMENTING AN UPDATE OF SOFTWARE OF A COMPONENT OF A VEHICLE

The present application is the U.S. national phase of PCT Application No. PCT/EP2021/055411, filed on Mar. 4, 2021, which claims priority of German patent application No. 10 2020 114 098.3, filed on May 26, 2020, which is incorporated herein by reference in its entirety.

BACKGROUND

The disclosure relates to a method and system for documenting an update of software of a component of a vehicle, as well as to a corresponding computer program and computer-readable storage medium.

An underlying object is to provide an efficient, lawful method and corresponding system for documenting an update of software of a component of a vehicle.

SUMMARY

The object, as well as others, are achieved by at least some embodiments disclosed herein.

A first aspect relates to a method for documenting an update of software of a component of a vehicle.

In the method, a request message is transmitted by the vehicle to a backend. The request message comprises system parameters of the vehicle.

In response to the request message, a check is carried out by the backend on the basis of the system parameters in order to determine whether an update of the software of the component is required. If so, an update message is transmitted by the backend to the vehicle. The update message comprises at least one text module which in each case describes a change relating to existing software of the component. A respective text module is assigned here in each case to a component.

In response to the update message, the at least one text module is provided on an output unit assigned to the vehicle.

With the proposed method, information relating to an update of software of one or more vehicle components can be provided efficiently and lawfully to a vehicle owner for documentation.

Computer programs and also associated data are referred to here and below as software. The software update can comprise, in particular, the simple transmission of a computer program or the simple transmission of associated data. The term software is understood to mean, in particular, firmware also.

Hardware modules or submodules and software modules or submodules can be considered here and below as components. In particular, software for carrying out a predefined vehicle function is assigned in each case to a component, said software being supplemented, modified or reinstalled during an update. In other words, a component refers to the smallest independent unit for implementing a vehicle function. The software that is to be supplemented, modified or reinstalled during the update (i.e. existing, installed software) can also be referred to as existing software.

Documentation refers here and below to a component-specific or vehicle-specific description of a corresponding software content. In other words, according to the first aspect, a method is therefore indicated, in particular, for describing a functional scope and changes by means of a software update.

In one advantageous design according to the first aspect, the request message is transmitted periodically by the vehicle to the backend. A request message is transmitted, for example, within a predefined time period, e.g. every hour, or on the occurrence of predefined events, e.g. after each vehicle start.

In one advantageous design according to the first aspect, the update message is an over-the-air, OTA, update.

The update message can also be referred to, for example, as a software-over-the-air, SOTA, update or firmware-over-the-air, FOTA, update.

In one advantageous design according to the first aspect, the system parameters contained in the request message comprise one or more of the following:

a base software version of the component;

a current software version of the component;

a target software version of the component;

a model of the vehicle;

a region for which the vehicle is provided;

a country for which the vehicle is provided;

at least one keyword which is representative in each case of a component installed in the vehicle which differs from a standard model of the vehicle.

In one advantageous design according to the first aspect, the system parameters contained in the request message further comprise one or more of the following:

a chassis number;

a prioritization codeword assigned to a driver of the vehicle, representative of a prioritized visualization of individual text modules of the update message;

a location signal;

at least one further keyword which is representative in each case of a retrofitted hardware component.

In one advantageous design according to the first aspect, the output unit assigned to the vehicle comprises one or more of the following:

a display device arranged in the vehicle;

an application assigned to a driver of the vehicle.

In one advantageous design according to the first aspect, the backend comprises a communication unit, an update unit, a text unit and a storage unit.

In the method, the request message is received by the communication unit and the system parameters are transmitted to the text unit depending on the request message.

Depending on the system parameters, the at least one text module is generated by the text unit, is stored at a storage location in the storage unit and the storage location is reported to the communication unit.

The system parameters and the storage location are transmitted by the communication unit to the update unit.

An update file is generated by the update unit depending on the system parameters. Depending on the storage location, the at least one text module is loaded from the storage unit by the update unit and, jointly linked with the update file, is provided to the communication unit.

The linking of the update file with the at least one text module is transmitted by the communication unit as an update message to the vehicle.

A packet comprising data for updating the corresponding software of the component is referred to here and below as an update file.

In one advantageous design according to the first aspect, a base text module and a base translation of the base text module into a multiplicity of predefined languages is stored in the backend for each component of the vehicle. A market-specific translation is optionally performed for the respective base translation and is stored in the backend.

Depending on the system parameters, the text unit chooses a text module from a base text module, base translation and market-specific translation for each component of the vehicle.

The text modules are stored, in particular, in the aforementioned storage unit. A market-specific marketing strategy, in particular, or legal requirements in the corresponding region for which the vehicle is provided can be taken into account with a market-specific translation.

A second aspect relates to a system for documenting an update of software of a component of a vehicle. The system comprises a backend having a signaling connection to the vehicle. The system is configured to carry out the method according to the first aspect.

A third aspect relates to a computer program comprising commands which, when the computer program is executed by a computer, prompt said computer to carry out the method according to the first aspect.

A fourth aspect relates to a computer-readable storage medium on which the computer program according to the third aspect is stored.

Exemplary embodiments of the invention are explained in detail below with reference to the schematic drawings.

DETAILED DESCRIPTION

Elements having the same design or function are denoted with the same reference numbers in all of the figures.

In the process of digitization, vehicle manufacturers have increasingly focused on over-the-air (OTA) updates in order to provide their vehicle fleets with the latest software updates. Due to the high number of variants and a high hardware variance, relevant software packages are relevant here to individual vehicles only on the basis of a multiplicity of control criteria (e.g. derivatives, special equipment, etc.) Due to legal requirements, it may be necessary, in the event of an over-the-air update, to inform a vehicle owner specifically and precisely of the changes that will be made to his vehicle as a result of the update.

Generic information in the event of OTA updates, such as total communication of update descriptions (release notes) of updates relating to a new software version that will be installed on a multiplicity of different vehicles from the same manufacturer (referred to as the "fleet"), comprises no specific changes or only very limited specific changes (e.g. in the case of technical actions) for the individual vehicle or relating to the respective vehicle owner. In other words, no vehicle-specific communication takes place here.

Since fleets already have an enormous variance in terms of the different derivatives, special equipment, hardware equipment, markets, etc., a vehicle-owner-individual or vehicle-specific communication of software contents becomes increasingly difficult. Conversely, a detailed analysis of the "bits and bytes" at software level is complicated and is not practical or is too fine-grained, specifically in coordination with markets and vehicle owners.

An aggregation on the basis of control criteria is proposed below, by means of which vehicles are provided with release notes in the event of OTA updates. In particular, it is proposed to make these control criteria similarly usable by market representatives in order to inform corresponding dealers and customers of update contents on the basis of understandable vehicle criteria.

The basic concept here is the implementation of comprehensive control criteria on the basis of which vehicles of a fleet can be provided with precise contents of an update.

Figure 1:
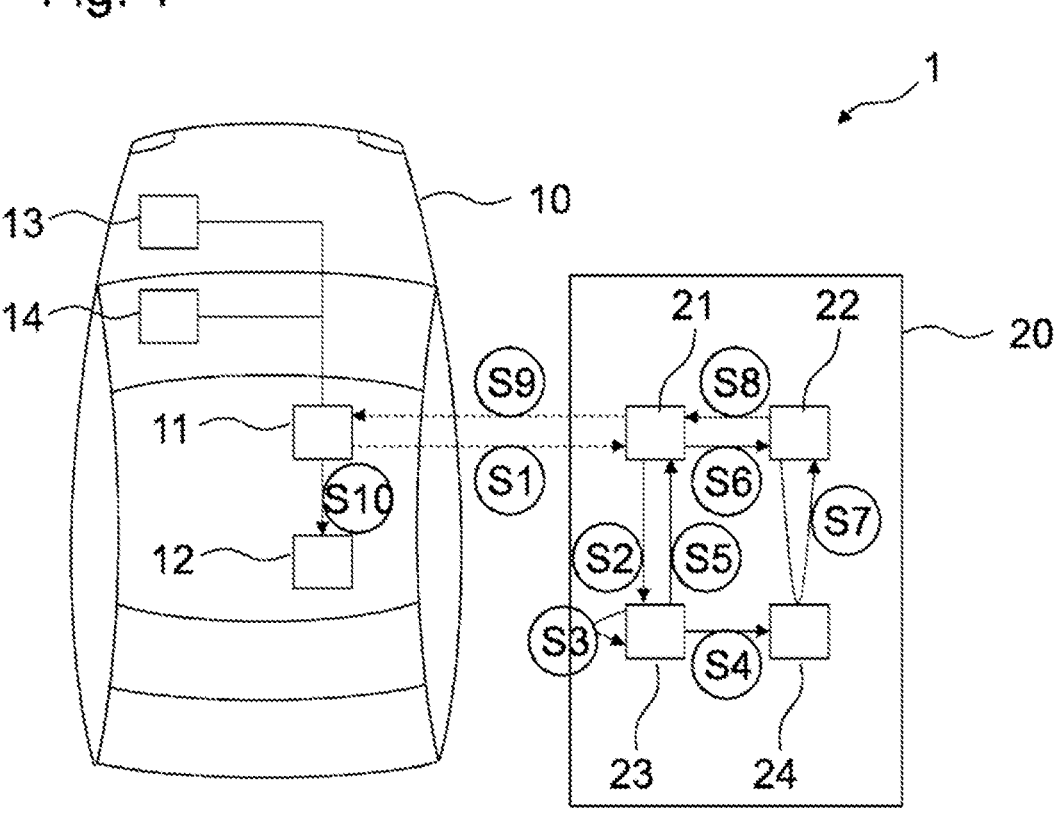
FIG. 1 shows an exemplary embodiment of a system for documenting an update of software of a component of a vehicle.

FIG. 1 shows an exemplary embodiment of a system 1 for documenting an update of software of a component 13, 14 of a vehicle 10.

The system 1 comprises a backend 20. The vehicle 10 has a control unit 11 with which the vehicle 10 has a signaling connection to a communication unit 21 of the backend 20 (indicated by dotted arrows). Along with the vehicle 10 shown, the backend 20 can have a signaling connection to a multiplicity of further vehicles. For example, the multiplicity of vehicles may be vehicles of a vehicle fleet.

The vehicle 10 additionally has a multiplicity of components 13, 14 which are designed in each case to perform a vehicle function by means of corresponding operating software. Here, this can be, for example, a driver assistance system such as a braking assistant or a driving comfort system such as an automatic air conditioning control. An output unit which is configured to provide an owner of the vehicle 10 with release notes for the corresponding operating software is further assigned to the vehicle 10. The output unit shown is, for example, a central information display 12.

Alternatively, or additionally, release notes can also be provided (not shown) on an app assigned to the owner on a mobile terminal of the owner, via a call center or display devices at a dealership, and also via a website. In this connection, the corresponding display is assigned, for example, to the vehicle 10 or owner through assignment of the chassis number.

Release notes contents of an upgrade are written and translated centrally by a corresponding technical department. They are then distributed to different markets and relevant control criteria, such as derivatives, special equipment, software variant and target, etc., are stored. The markets then have the facility to revise the wording of the release notes contents in their respective market language (or in a plurality of languages) and store them. These release notes are stored centrally, along with the relevant control criteria. In the event of an OTA request from a vehicle in the backend, the vehicle also sends information relating to its current vehicle configuration. These data are then used in the backend to perform a calculation in order to determine which specific release notes text modules are distributed to this vehicle with the update. The text modules are then sent with the software package to the vehicle. A driver of the vehicle has the facility, for example, before the start of the update procedure in the vehicle, to inform himself precisely of the update content on the basis of these release notes. The text of these text modules can similarly be used in parallel at other access points (touchpoints) in order to provide the vehicle-specific information for the update. This can take place, for example, in the web portal, on an app of the vehicle manufacturer, or at dealer touchpoints.

Figure 2:
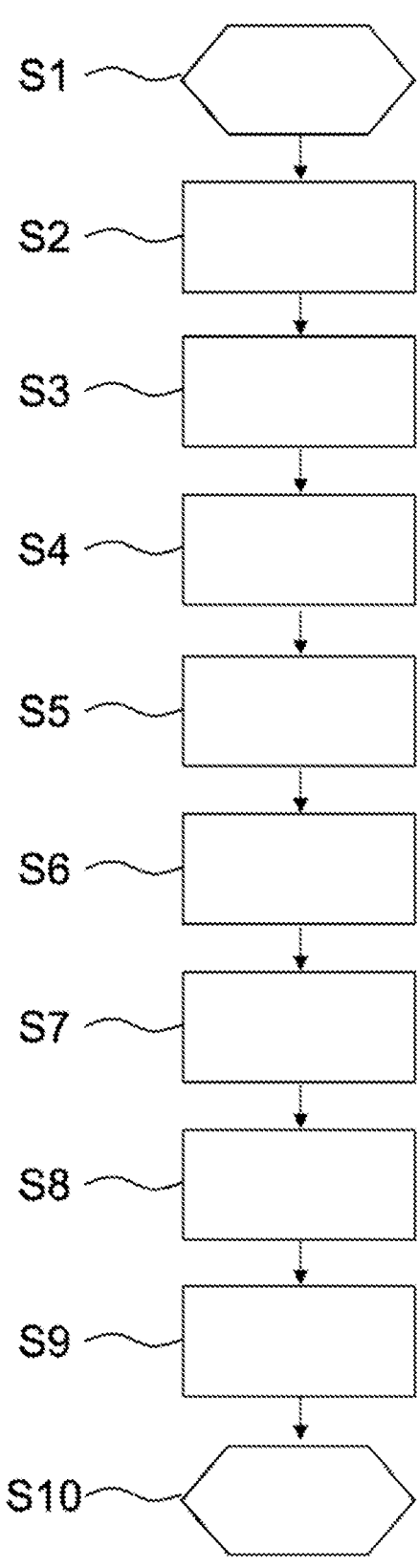
FIG. 2 shows a flow diagram for documenting an update of software of the component of the vehicle.

In this connection, along with the communication unit 21, the backend 20 has an update unit 22, a text unit 23 and a storage unit 24. A data and program memory in which program steps for documenting an update of software of the components 13, 14 of the vehicle 10 by means of the system 1 are respectively stored is assigned in each case to the backend 20 and to the control unit 11, said program steps being described below by means of the flow diagram shown in FIG. 2.

The program starts in a step S1 in which a request message is transmitted by the vehicle 10 to the communication unit 21. The request message is an OTA request which comprises system parameters of the vehicle 10 and optionally a unique request identification. The table below shows possible system parameters.

| requestID | Unique ID generated by communication unit 21 |
|---|---|
| VIN | Vehicle Identifier Number, unique chassis number |
| Timestamp | Timestamp of the request |
| baseIlevel | Base software version of the components 13, 14 |
| currentIlevel | Current software version of the components 13, 14 |
| targetIlevel | Target software version of the components 13, 14 |
| gcid | Unique owner identification for prioritized visualization of individual text modules of the update message |
| Model | Model of the vehicle 10 |
| Market | Region for which the vehicle 10 is provided (allocated by communication unit 21) |
| TechnicalAction | Technical measures which impact on the vehicle 10 and are implemented with this update |
| Country | Country for which the vehicle 10 is provided (configuration of the vehicle 10) |
| Brand | BMW, BMWi, Rolls-Royce or MINI |
| saCodes | List of keywords which are representative in each case of special equipment or components installed in the vehicle 10 differing from a standard configuration |
| Gps | Location data of the vehicle 10 (when the request is generated) |
| kWords | List of further keywords which are representative in each case of hardware components retrofitted in the vehicle 10 |
| eWords | |
| Tags | Tags of the request (in order to activate or deactivate specific functions) |
| AftersalesFeatures | Service IDs of purchased aftersales functions |

A check is then carried out by the backend 20 on the basis of the system parameters to determine whether an update of the software of one of the components 13, 14 is required. This is the case, for example, if the current software version of the components 13, 14 differs from the target software version of the components 13, 14. In this case, the system parameters are transmitted to the text unit 23 in a step S2. In other words, in step S2, the communication unit 21 requests a release note, RN, generation. A unique RequestID and the configuration of the respective vehicle 10 are also transmitted.

In the following step S3, the text unit 23 generates at least one text module 23 depending on the system parameters. In other words, a vehicle-specific RN is generated.

The at least one text module is then stored at a storage location in the storage unit 24 (step S4). The storage unit is, for example, an S3 storage device.

In a following step S5, the storage location is reported to the communication unit 21. In other words, the text unit 23 informs the communication unit 21 that an RN has been generated and transmits, for example, a corresponding URL of this RN to the communication unit.

The system parameters and the storage location are then transmitted (step S6) by the communication unit 21 to the update unit 22. In other words, the communication unit 21 prompts the update unit 22 to generate an update file for the vehicle 10, wherein the URL of the RN is reported in this request.

In a following step S7, the update unit 22 loads the at least one text module from the storage unit 24 and links it to the update file. In other words, the respective RN is linked with the update file.

Finally, the linking of the update file with the at least one text module is provided (step S8) to the communication unit 21 and is transmitted (step S9) to the vehicle 10 or to a corresponding touchpoint.

In a last step S10, the at least one text module or the RN is provided on the output unit, in the present example on the central information display 12. The program is then, for example, ended. Alternatively, an update of the software of the components 13, 14 can be prompted by means of the update file, e.g. following the display of the RN and the consent of the driver.

REFERENCE NUMBER LIST

1 System
10 Vehicle
11 Control unit
12 Central information display
13 Component
14 Component
20 Backend
21 Communication unit
22 Update unit
23 Text unit
24 Storage unit
S1-S10 Program steps

The invention claimed is:

1. A method for documenting an update of software of a component of a vehicle, the method comprising:
   receiving in a backend a request message transmitted by the vehicle, the request message comprising system parameters of the vehicle;
   in response to the request message, carrying out at the backend a check using the system parameters in order to determine whether an update of the software of the component is required and, if so, transmitting an update message by the backend to the vehicle, wherein the update message comprises at least one text module which in each case describes a change relating to existing software of the component, wherein a respective text module is assigned in each case to a respective component; and
   in response to the update message, providing the at least one text module on an output unit assigned to the vehicle.

2. The method as claimed in claim 1, further comprising periodically receiving at the backend the request message transmitted by the vehicle.

3. The method as claimed in claim 1, wherein the update message is an over-the-air update.

4. The method as claimed in claim 1, wherein the system parameters contained in the request message comprise one or more of the group consisting of:
   a base software version of the component;
   a current software version of the component;
   a target software version of the component;
   a model of the vehicle;
   a region for which the vehicle is provided;
   a country for which the vehicle is provided; and
   at least one keyword which is representative in each case of the component installed in the vehicle which differs from a standard model of the vehicle.

5. The method as claimed in claim 4, wherein the system parameters contained in the request message further comprise one or more of the group consisting of:

a chassis number;

a prioritization codeword assigned to a driver of the vehicle, representative of a prioritized visualization of individual text modules of the update message;

a location signal; and at least one further keyword which is representative in each case of a retrofitted hardware component.

6. The method as claimed in claim 1, wherein the system parameters contained in the request message includes software version information, and geographical information corresponding to the vehicle.

7. The method as claimed in claim 1, wherein the system parameters contained in the request message includes software version information and information representative in each case of a component installed in the vehicle which differs from a standard model of the vehicle.

8. The method as claimed in claim 1, wherein the output unit assigned to the vehicle comprises one or more of the group consisting of:

a display device arranged in the vehicle; and an application assigned to a driver of the vehicle.

9. The method as claimed in claim 1, wherein:

the backend comprises a communication unit, an update unit, a text unit and storage unit;

the request message is received by the communication unit and the system parameters are transmitted to the text unit depending on the request message;

depending on the system parameters, the at least one text module is generated by the text unit and is stored at a storage location in the storage unit, and the storage location is reported to the communication unit;

the system parameters and the storage location are transmitted by the communication unit to the update unit;

an update file is generated by the update unit depending on the system parameters;

depending on the storage location, the at least one text module is loaded from the storage unit by the update unit and, linked with the update file, is provided to the communication unit; and a linking of the update file with the at least one text module is transmitted by the communication unit as the update message to the vehicle.

10. The method as claimed in claim 9, wherein a base text module and a base translation of the base text module into a multiplicity of predefined languages is stored in the backend for each component of the vehicle, a market-specific translation is optionally performed for the respective base translation and is stored in the backend, and depending on the system parameters, the text unit chooses a text module from a base text module, base translation and market-specific translation for each component of the vehicle.

11. A system for documenting an update of software of a component of a vehicle, comprising a backend having a signaling connection to the vehicle, wherein the system is configured to carry out the method as claimed in claim 1.

12. The system as claimed in claim 11, wherein:

the backend comprises a communication unit, an update unit, a text unit and storage unit;

the request message is received by the communication unit and the system parameters are transmitted to the text unit depending on the request message;

depending on the system parameters, the at least one text module is generated by the text unit and is stored at a storage location in the storage unit, and the storage location is reported to the communication unit;

the system parameters and the storage location are transmitted by the communication unit to the update unit;

an update file is generated by the update unit depending on the system parameters;

depending on the storage location, the at least one text module is loaded from the storage unit by the update unit and, linked with the update file, is provided to the communication unit; and a linking of the update file with the at least one text module is transmitted by the communication unit as an update message to the vehicle.

13. The system as claimed in claim 11, wherein the system parameters contained in the request message includes software version information, and geographical information corresponding to the vehicle.

14. The system as claimed in claim 11, wherein the system parameters contained in the request message includes software version information and information representative in each case of a component installed in the vehicle which differs from a standard model of the vehicle.

15. The system as claimed in claim 11, wherein the system parameters contained in the request message comprise one or more of the group consisting of:

a base software version of the component;

a current software version of the component;

a target software version of the component;

a model of the vehicle;

a region for which the vehicle is provided;

a country for which the vehicle is provided; and at least one keyword which is representative in each case of the component installed in the vehicle which differs from a standard model of the vehicle.

16. The system as claimed in claim 15, wherein the system parameters contained in the request message further comprise one or more of the group consisting of:

a chassis number;

a prioritization codeword assigned to a driver of the vehicle, representative of a prioritized visualization of individual text modules of the update message;

a location signal;

at least one further keyword which is representative in each case of a retrofitted hardware component.

17. A non-transitory computer-readable storage medium storing a computer program comprising commands which, when executed by a computer, prompt said computer to carry out the method as claimed in one of claim 1.

18. The method as claimed in claim 1, wherein the system parameters contained in the request message comprise:

software version information of the component;

a model of the vehicle;

information for an area for which the vehicle is provided; and a prioritization codeword assigned to a driver of the vehicle, representative of a prioritized visualization of individual text modules of the update message.

* * * * *